(12) United States Patent
Tang et al.

(10) Patent No.: US 8,767,806 B2
(45) Date of Patent: Jul. 1, 2014

(54) CXP TO QSFP+ MODULE FORM FACTOR ADAPTER

(75) Inventors: Norman Tang, Los Altos, CA (US); Liang Ping Peng, Santa Clara, CA (US); David Lai, Mountain View, CA (US); Alex Hu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 150 days.

(21) Appl. No.: 13/424,742

(22) Filed: Mar. 20, 2012

(65) Prior Publication Data

US 2013/0251052 A1 Sep. 26, 2013

(51) Int. Cl.
*H04B 1/38* (2006.01)
*H04L 5/16* (2006.01)

(52) U.S. Cl.
USPC .......................................... 375/220; 375/219

(58) Field of Classification Search
USPC ........................................................ 375/220
See application file for complete search history.

(56) References Cited

U.S. PATENT DOCUMENTS

| 8,075,199 | B2 | 12/2011 | Losio et al. | |
|---|---|---|---|---|
| 2009/0257754 | A1 | 10/2009 | Theodoras, II et al. | |
| 2012/0051735 | A1* | 3/2012 | Achkir et al. | 398/16 |
| 2013/0156077 | A1* | 6/2013 | Au et al. | 375/220 |
| 2013/0177309 | A1* | 7/2013 | El-Ahmadi et al. | 398/25 |

* cited by examiner

*Primary Examiner* — Erin File
(74) *Attorney, Agent, or Firm* — Edell, Shapiro & Finnan, LLC

(57) ABSTRACT

Techniques are provided for an adapter device configured to enable communications between a quad small form-factor pluggable (QSFP) transceiver unit and a CXP host port. The adapter device comprises a first connector unit, a second connector unit, a microcontroller unit and a plurality of reception equalizer units. Data signals are sent by the transceiver unit to a first equalizer unit via the first connector unit. The first equalizer unit adjusts the data signals and sends the data signals to the host port via the second connector unit. Likewise, data signals are sent by the host port to a second equalizer unit via the second connector unit. The second equalizer unit adjusts the data signals and sends the data signals to the transceiver unit via the first connector unit.

20 Claims, 4 Drawing Sheets

HOST SIDE

MODULE / LINE SIDE

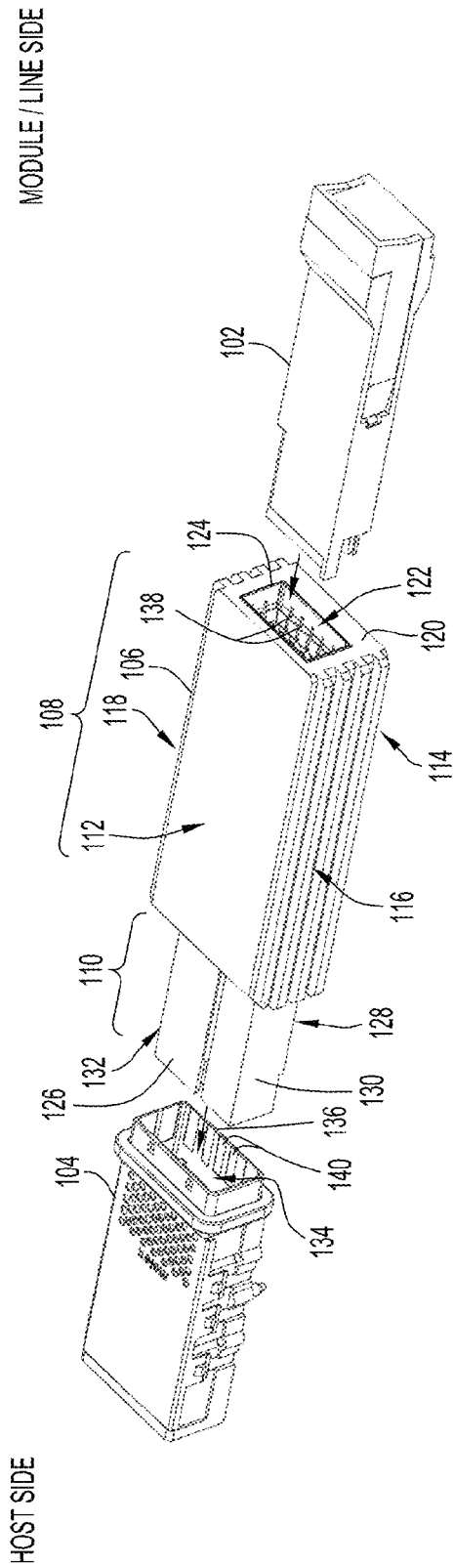
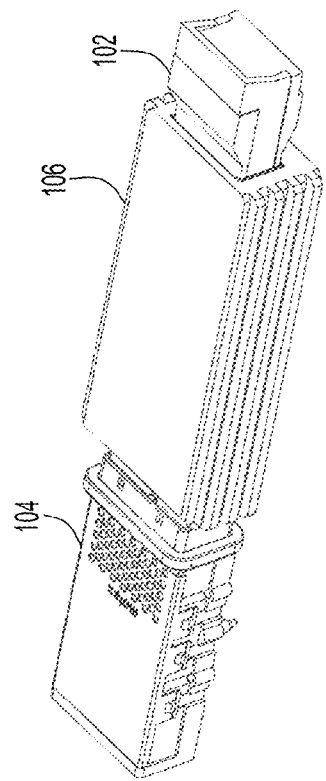
FIG.1A
FIG.1B

CXP TO QSFP+ MODULE FORM FACTOR ADAPTER

TECHNICAL FIELD

The present disclosure relates to data communications between a quad small form-factor pluggable (QSFP) transceiver unit and a CXP host port.

BACKGROUND

Quad small form-factor pluggable (QSFP) transceiver units have been developed to address the need for platforms or devices to support data signals with enhanced data rates (e.g., 40 gigabits per second or 40G signals). Similarly, CXP form-factor transceiver units (in compliance with standards set forth by the InfiniBand Trade Association) have been developed for devices capable of supporting data signals at even higher data rates of 100 gigabits per second to 120 gigabits per second. Existing techniques offer solutions to support 40G signals in dual-rate CXP ports by using a fan-out cable to interface between QSFP transceiver units and CXP ports. These fan-out cables, however, are cumbersome and thus complicate the cable management for these communications.

BRIEF DESCRIPTION OF THE DRAWINGS

FIGS. 1A and 1B are example topologies depicting an adapter device configured to receive an enhanced quad small form-factor pluggable (QSFP+) transceiver unit and configured to plug into a CXP host port.

DESCRIPTION OF EXAMPLE EMBODIMENTS

Overview

Figure 2:
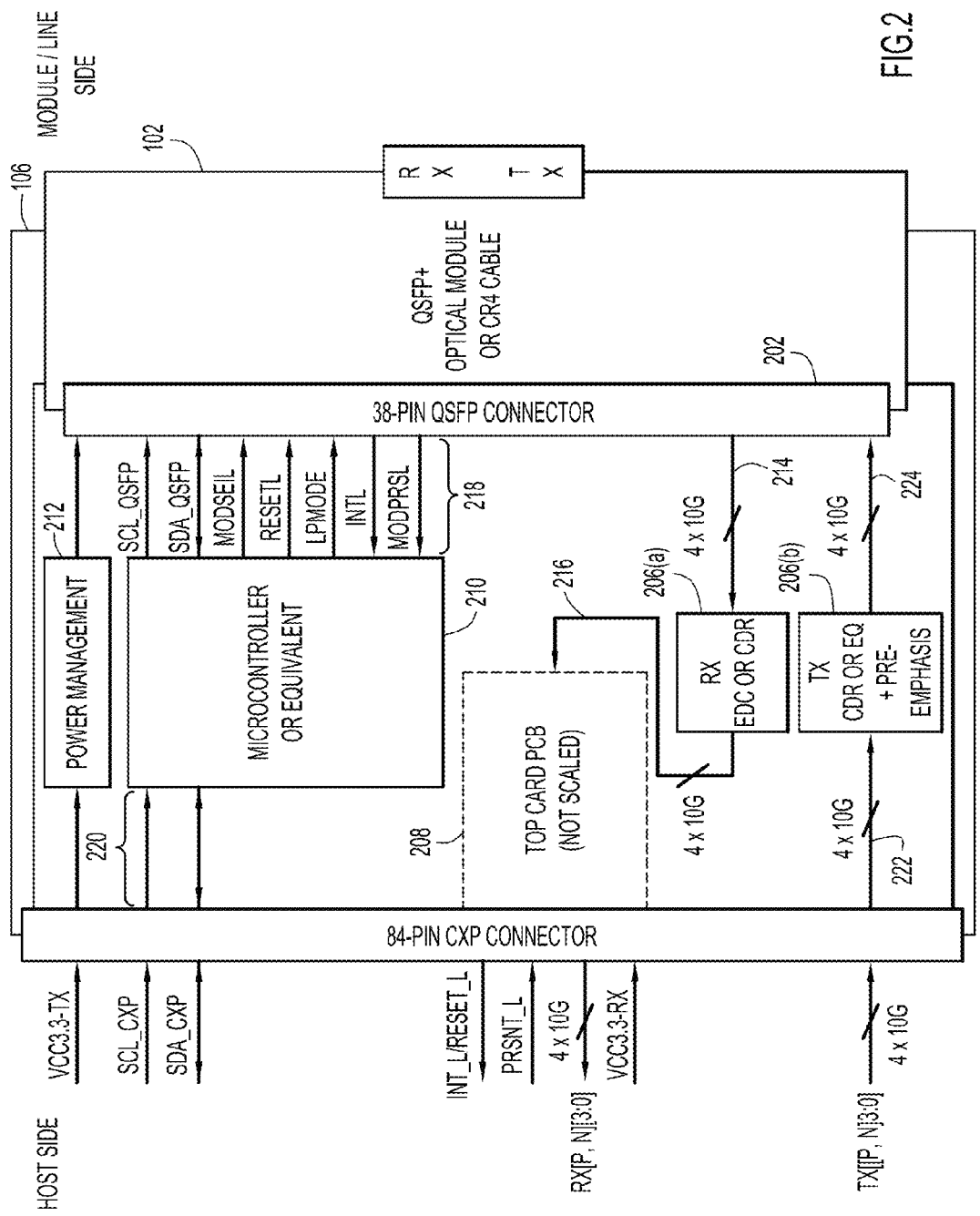
FIG. 2 is an example block diagram depicting components of the adapter device including a plurality of equalizer units configured to adjust module-to-host data signals received by the adapter device from the QSFP+ transceiver unit and to adjust host-to-module transmission data signals received by the adapter device from the CXP host port.

Techniques are provided for an adapter device configured to enable communications between an enhanced quad small form-factor pluggable (QSFP+) transceiver unit and a CXP host port. The adapter device comprises a first connector unit, a second connector unit, a microcontroller unit and a plurality of reception equalizer units. For data communications in the module-to-host direction, the first connector unit is configured to receive reception data signals at a data rate from a transceiver unit. A reception equalizer unit is electrically connected to the first connector unit and receives the reception data signals at the data rate along a first module signal path. The reception equalizer unit adjusts the reception data signals to be compatible for reception by a host port. The microcontroller unit is electrically connected to the first connector unit and is configured to receive reception status signals from the first connector unit along a first module status signal path. The microcontroller unit adjusts the reception status signals to be compatible for reception by the host port. The second connector unit is electrically connected to the reception equalizer unit and the microcontroller unit. The second connector unit is configured to receive adjusted reception data signals from the reception equalizer unit along a second module signal path. The second connector unit also receives adjusted reception status signals from the microcontroller unit along a second module status signal path and sends the adjusted reception data signals and the adjusted reception status signals to the host port.

For data communications in the host-to-module direction, a host connector unit receives transmission data signals at a host data rate from a host port. A transmission equalizer unit is electrically connected to the host connector unit and receives the transmission data signals at the host data rate along a first host signal path. The transmission equalizer unit adjusts the transmission data signals to be compatible for reception by a transceiver unit. The microcontroller unit is electrically connected to the host connector unit and adjusts the transmission control signals to be compatible for reception by the transceiver unit. A module connector unit is electrically connected to the transmission equalizer unit and the microcontroller unit and is configured to receive adjusted transmission data signals from the transmission equalizer unit along a second host signal path, receive adjusted transmission control signals from the microcontroller unit along a second host control signal path and send the adjusted transmission data signals and the adjusted transmission control signals to the transceiver unit.

Example Embodiments

The techniques described herein involve an adapter device that enables sending and receiving data communications at enhanced data rates between a transceiver module unit and a host port. An example topology 100 is illustrated in FIGS. 1A and 1B. The topology 100 has a transceiver module unit ("transceiver unit") 102, a host port device ("host port") 104 and an adapter apparatus or device ("adapter device") 106. The adapter device 106 is configured to interface with the transceiver unit 102 and the host port 104 to enable data communications between the transceiver unit 102 and the host port 104, as described herein.

FIG. 1A shows the topology 100 in a detached view. As shown in FIG. 1A, the adapter device 106 has a main body shown at reference numeral 108 and an insertion portion shown at reference numeral 110. The main body 108 of the adapter device 106 comprises a top surface 112, a bottom surface 114 and side surfaces 116 and 118. The top surface 112 and the bottom surface 114 of the main body 108 are parallel to each other and extend in a longitudinal direction. Similarly, the side surfaces 116 and 118 of the main body 108 are also parallel to each other and extend in the longitudinal direction. In one example, the side surfaces 116 and 118 may comprise a plurality of fins which operate as heat sinks for the adapter device 106. The main body 108 also has an end surface 120 with an adapter opening or cavity 122. The adapter opening 122 is configured to receive the transceiver unit 102 such that the transceiver unit 102 is housed in the main body 108 of the adapter device 106. For example, the transceiver unit 102 may be inserted or plugged into the adapter opening 122 along the longitudinal direction, as shown by arrow 124.

The insertion portion 110 of the adapter device 106 also has a top surface 126, a bottom surface 128 and side surfaces 130 and 132. The top surface 126 and the bottom surface 128 of the insertion portion 110 of the adapter device 106 are parallel to each other and extend in the longitudinal direction. Similarly, the side surfaces 130 and 132 of the insertion portion 110 of the adapter device 106 are parallel to each other and extend in the longitudinal direction.

The insertion portion 110 of the adapter device 106 is configured to be plugged in or inserted into a host port opening or cage 134 of the host port 104. For example, the insertion portion 110 of the adapter device 106 may be plugged into the host port opening 134 along the longitudinal direction, as shown by arrow 136, such that the insertion portion 110 is housed in the host port 104. The insertion portion 110 of the adapter device 106 may have a transverse cross section having smaller dimensions than the transverse cross section dimensions of the main body 108. In one example, the transverse cross section dimensions of the insertion portion 110 has dimensions that enable the insertion portion 110 of the adapter device 106 to be inserted into a host port opening 134 of the host port 104.

When the transceiver unit 102 plugs into the adapter opening 122 of the main body 108 of the adapter device 106 and when the insertion portion 110 of the adapter device 106 plugs into the host port opening 134 of the host port 104, an electrical connection is created between the transceiver unit 102, the adapter device 106 and the host port 104. In one example, when the transceiver unit 102 plugs into the adapter opening 122 of the adapter device 106, the transceiver unit 102 engages one or more adapter pins 138 located in the adapter opening 122. This enables an electrical connection between the transceiver unit 102 and the adapter device 106 when the transceiver unit 102 is inserted into the adapter opening 122. Likewise, when the insertion portion 110 of the adapter device 106 plugs into the host port opening 134 of the host port 104, the insertion portion 110 engages one or more adapter pins 140 located in the host port opening 134. For example, the insertion portion 110 of the adapter device 106 may comprise a circuit adapter unit configured to interface with a printed circuit board or connector unit located in the host port opening 134 of the host port 104. This enables an electrical connection between the host port 104 and the adapter device 106 when the insertion portion 110 of the adapter device 106 is inserted into the host port opening 134. Thus, when the transceiver unit 102 is plugged into the adapter device 106 and when the adapter device 106 is plugged into the host port 104, as shown in the attached view of FIG. 1B, there is an electrical connection between the transceiver unit 102 and the host port 104 via the adapter device 106. This electrical connection enables data communications between the transceiver unit 102 and the host port 104, as described herein.

In general, the transceiver unit 102 is configured to send and receive data communications at enhanced data rates to the host port 104 via the adapter device 106. For example, the transceiver unit 102 may be an enhanced quad small form-factor pluggable (QSFP+) module that is configured to transmit data communications at a data rate of 40 gigabits per second (hereinafter "40G," "40G signals" or "40G Ethernet"). Likewise, the host port 104 is configured to receive data communications from the transceiver unit 102 via the adapter device 106 and is configured to send data communications at enhanced data rates to the transceiver unit 102 via the adapter device 106. For example, the host port 104 may be a CXP host port (e.g., as specified by standards set forth by the InfiniBand Trade Association) configured to send 40G signals to the transceiver unit 102 via the adapter device 106. For convenience, the transceiver unit 102 is referred to hereinafter as a "QSFP+ transceiver unit 102" and the host port 104 is referred to hereinafter as a "CXP host port 104." It should be appreciated, however, that the transceiver unit 102 may be another transceiver in accordance with other communication standards configured to send and receive data communications and that the host port 104 may be configured as another host port in accordance with other communication standards to send and receive data communications according to the techniques described herein.

As shown in FIGS. 1A and 1B, the QSFP+ transceiver unit 102 resides on one side of the adapter device 106, known as the "module" or "line side." The CXP host port 104 resides on another side of the adapter device 106, known as the "host side." According to the techniques described hereinafter, 40G signals may be sent from the module side (e.g., from the QSFP+ transceiver unit 102) to the host side (e.g., to the CXP host port 104). These techniques are referred to hereinafter as "module-to-host data communications" or "line-to-host data communications." Similarly, according to the techniques described hereinafter, data may be transferred from the host side to the module/line side, and these transmissions are referred to hereinafter as "host-to-module data communications" or "host-to-line data communications."

Reference is now made to FIG. 2, which shows an example block diagram depicting components of the adapter device 106. FIG. 2 shows the adapter device 106 in a semi-attached configuration, where the QSFP+ transceiver unit 102 is plugged into the adapter device 106, (e.g., by being plugged into the adapter opening 122 as described above in connection with FIGS. 1A and 1B). It should be noted that FIG. 2 does not show the adapter device 106 being plugged into the CXP host port 104, and thus the adapter device 106 is shown in the semi-attached configuration.

The adapter device 106 comprises a first connector unit 202 and a second connector unit 204. The first connector unit 202 is configured to interface with the QSFP+ transceiver unit 102, and the second connector unit 204 is configured to interface with the CXP host port 104. For example, the first connector unit 202 is a 38-pin QSFP connector unit that is configured to interface with corresponding pins on the QSFP+ transceiver unit 102. Likewise, the second connector unit 204 is an 84-pin CXP connector unit that is configured to interface with corresponding pins on the CXP host port 104. The first connector unit 202 is also referred to hereinafter as a "module connector unit" and the second connector unit 204 is referred to hereinafter as a "host connector unit."

The adapter device 106 also comprises a plurality of equalizer units, shown at reference numerals 206(a) and 206(b). The equalizer units are electrically connected to the first connector unit 202 and to the second connector unit 204. Though FIG. 2 shows two equalizer units, it should be appreciated that any number of equalizer units may be used that are electrically connected the first connector unit 202 and the second connector unit 204. The adapter device 106 may also comprise a circuit adapter unit 208 that is electrically connected to the second connector unit 204 and to one or more of the equalizer units 206(a) and 206(b). For example, as shown in FIG. 2, the circuit adapter unit 208 resides between the equalizer unit 206(a) and the second connector unit 204. The adapter device 106 further comprises a microcontroller unit 210 electrically connected to the first connector unit 202 and the second connector unit 204 and a power management unit 212 electrically connected to the first connector unit 202 and the second connector unit 204.

As stated above, when the QSFP+ transceiver unit 102 interfaces with the first connector unit 202, the QSFP+ transceiver unit 102 is able to send module-to-host data communications to the CXP host port 104 via the adapter device 106 (when the adapter device 106 is plugged into the host port opening 134 of the host port 104) Likewise, the QSFP+ transceiver unit 102 is configured to receive host-to-module data communications from the CXP host port 104 via the adapter device 106. The module-to-host data communications and the host-to-module data communications are now described.

Module-to-Host Data Communications

For module-to-host data communications between the QSFP+ transceiver unit 102 and the CXP host port 104, the QSFP+ transceiver unit 102 first sends 40G signals to the adapter device 106 via the first connector unit 202. These 40G signals are referred to hereinafter as "reception data signals" since they are intended to be received by the CXP host port 104. The reception data signals are sent to the equalizer unit 206(a), referred to hereinafter as the "reception equalizer unit 206(a)," across a first module signal path, shown at reference numeral 214. In one example, the 40G reception data signals may be sent across four data links in the first module signal path 214, each of which is configured to carry data signals at a data rate of ten gigabits per second (10G). It should be appreciated, however, that the 40G reception data signals may be sent from the first connector unit 202 to the reception equalizer unit 206(a) across any number of data links configured to carry data signals at any data rate.

The reception equalizer unit 206(a) receives the reception data signals across the first module signal path 214. The reception equalizer unit 206(a) is configured to adjust the reception data signals such that the reception data signals are compatible for reception by the CXP host port 104. For example, the reception equalizer unit 206(a) is configured to improve the reception data signals for better signal integrity for reception by the CXP host port 104. The reception equalizer unit 206(a) may retime the reception data signals to compensate for high levels of jitter and crosstalk that may be present in the reception data signals. In one example, the reception equalizer unit 206(a) is a clock data recovery (CDR) unit that is configured to recover the clock and data from the reception data signals and to combat high-jitter and crosstalk tendencies of the reception data signals.

After the reception data signals are adjusted, the reception equalizer unit 206(a) sends the adjusted reception data signals to the second connector unit 204 along a second module signal path, shown at reference numeral 216. As stated above and shown in FIG. 2, the reception equalizer unit 206(a) may send the adjusted reception data signals to the circuit adapter unit 208. The circuit adapter unit 208 is configured to provide an electrical connection between the reception equalizer unit 206(a) and a printed circuit board of the host port 104 via the second connector unit 204. Upon receiving the adjusted reception data signals from the reception equalizer unit 206 (a) along the second module signal path 216, the second connector unit 204 sends the adjusted reception data signals to the CXP host port 104. Thus, the adapter device 106 enables 40G data signals to be sent from the QSFP+ transceiver unit 102 to the CXP host port 104.

During the module-to-host communications, reception status signals may also be sent by the QSFP+ transceiver unit 102 to the CXP host port 104 via the adapter device 106. For example, the QSFP+ transceiver unit 102 may send status signals to the adapter device 106 via the first connector unit 202. These status signals are referred to hereinafter as "reception status signals." The reception status signals are sent from the first connector unit 202 to the microcontroller unit 210 across a first module status signal path 218. The microcontroller unit 210 adjusts the reception status signals such that the reception status signals are compatible for reception by the CXP host port 104. The adjusted reception status signals are sent to the second connector unit 204 across a second module signal path 220. Upon receiving the reception status signals, the second connector unit 202 sends the adjusted reception status signals to the CXP host port 104.

Host-to-Module Data Communications

For host-to-module data communications between the CXP host port 104 and the QSFP+ transceiver unit 102, the CXP host port 104 sends 40G signals to the adapter device 106 via the host connector unit 204 (e.g., the second connector unit 204). These 40G signals are referred to hereinafter as "transmission data signals" since they are intended to be sent or transmitted by the CXP host port 104. The transmission data signals are sent to the equalizer unit 206(b), referred to hereinafter as the "transmission equalizer unit 206(b)," across a first host signal path 222. As described above in connection with module-to-host data communications, the 40G transmission data signals may be sent across four data links in the first host signal path 222, each of which is configured to carry 10G data signals, though it should be appreciated that the 40G transmission data signals may be sent from the host connector unit 204 to the transmission equalizer unit 206(b) across any number of data links configured to carry data signals at any data rate.

The transmission equalizer unit 206(b) is configured to improve the transmission data signals for better signal integrity for reception by the QSFP+ transceiver unit 102. For example, the transmission equalizer unit 206(b) (e.g., a CDR unit) is configured to retime the transmission data signals to compensate for high levels of jitter and crosstalk in a similar manner as the reception equalizer unit 206(a) (described above).

After the transmission data signals are adjusted, the transmission equalizer unit 206(b) sends the adjusted transmission data signals to the module connector unit 202 (e.g., the first connector unit 202) along a second host signal path 224. Upon receiving the adjusted transmission data signals from the transmission equalizer unit 206(b) along the second host signal path 224, the module connector unit 202 sends the adjusted reception data signals to the QSFP+ transceiver unit 102. Thus, the adapter device 106 enables 40G data signals to be sent from the CXP host port 104 to the QSFP+ transceiver unit 102.

During the host-to-module communications, transmission control signals may also be sent by the CXP host port 104 to the QSFP+ transceiver unit 102 via the adapter device 106. For example, the CXP host port 104 may send control signals to the adapter device 106 via the host connector unit 204. These control signals are referred to hereinafter as "transmission control signals." The transmission control signals are sent from the host connector unit 204 to the microcontroller unit 210 across a first host control signal path 220 (e.g., the second module status signal path 220). The microcontroller unit 210 adjusts the transmission control signals such that the transmission control signals are compatible for reception by the QSFP+ transceiver unit 102. The adjusted transmission control signals are sent to the module connector unit 202 across a second host signal path 218 (e.g., the first module status signal path 218). Upon receiving the transmission control signals, the module connector unit 202 sends the adjusted transmission control signals the QSFP+ transceiver unit 102.

There may be a need to supply power from the CXP host port 104 or the second connector unit 202 to both the adapter device 106 and the first connector unit 202. Accordingly, the power supply pins on the first connector unit 202 may be configured to receive power from a first voltage power source and power supply pins on the second connector unit 204 may be configured to receive power from a second voltage power source. The first voltage power source and the second voltage power source (not shown in FIG. 2) may be configured to supply power at different voltage levels. In order to maintain compatibility between the QSFP+ transceiver unit 102 and the CXP host port 104, the power management unit 212 may be configured to adjust or standardize the power settings of the power supply pins such that the power supply pins of the first connector unit 202 are configured to receive sufficient power. For example, the power supply pins of the first connector unit 202 may be configured to receive the same power at the same voltage levels as the power supply pins on the second connector unit 204 (e.g., 3.3 volts). Other times, however, the power supply pins on the first connector unit 202 and the second connector unit 204 may already be configured to receive power at the same voltage level, and thus in this example, the power management unit 212 may not need to adjust the power settings of the power supply pins.

Figure 3:
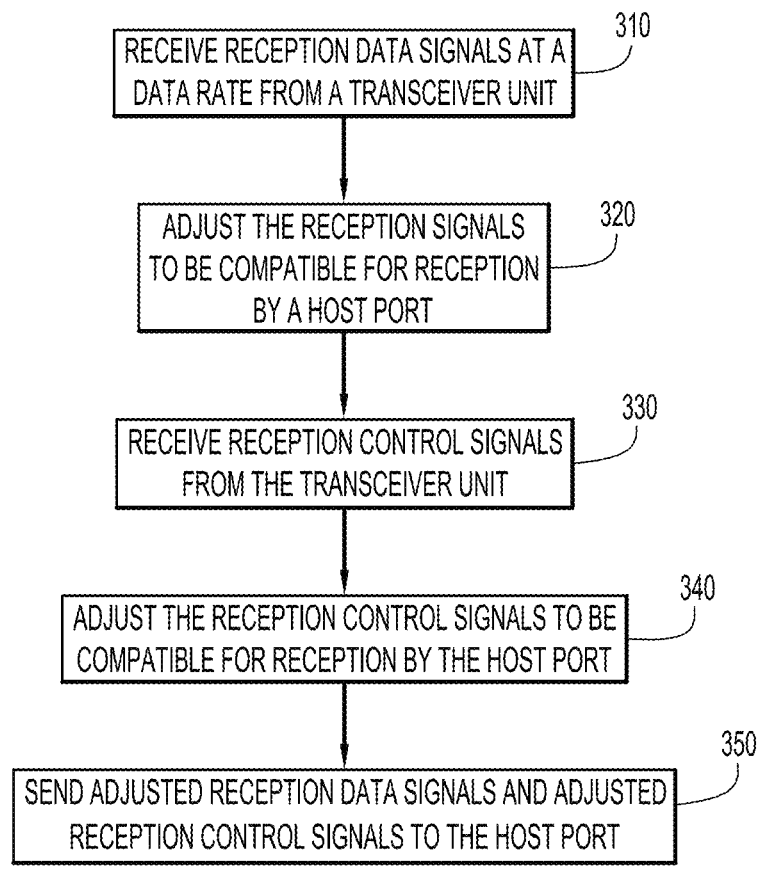
FIG. 3 is an example flow chart for module-to-host data communications between the QSFP+ transceiver unit and the CXP host port via the adapter device.

Reference is now made to FIG. 3, which shows an example flow chart for module-to-host data communications between the QSFP+ transceiver unit 102 and the CXP host port 104 via the adapter device 106. At operation 310, the adapter device 106 receives reception data signals at a data rate (e.g., 40G signals) from a transceiver unit (e.g., the QSFP+ transceiver unit 102). The adapter device 106, at operation 320, then adjusts the reception signals to be compatible for reception by a host port (e.g., the CXP host port 104). At 330, the adapter device 106 receives reception status signals from the QSFP+ transceiver unit 102, and at operation 340, adjusts the reception status signals to be compatible for reception by the CXP host port 104. At operation 350, the adapter device 106 sends the adjusted reception data signals and the adjusted reception status signals to the CXP host port 104.

Figure 4:
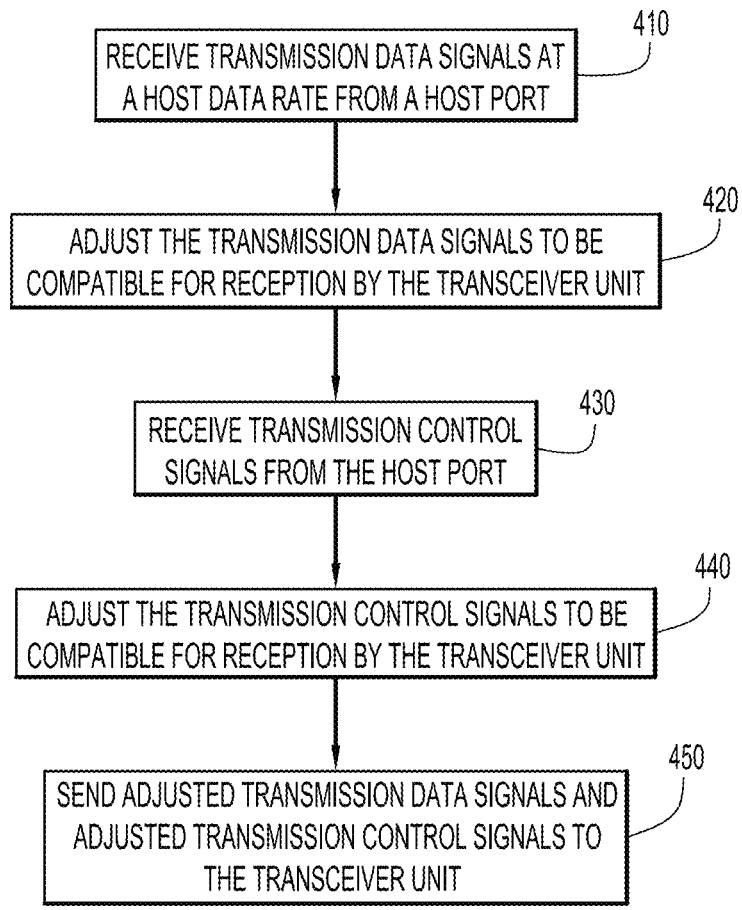
FIG. 4 is an example flow chart for host-to-module data communications between the CXP host port and the QSFP transceiver unit via the adapter device.

Reference is now made to FIG. 4, which shows an example flow chart for host-to-module data communications between the CXP host port 104 and the QSFP+ transceiver unit 102 via the adapter device 106. At operation 410, the adapter device 106 receives transmission data signals at a host data rate (e.g., 40G signals) from a host port (e.g., the CXP host port 104). The transmission data signals are adjusted, at operation 420, to be compatible for reception by a transceiver unit (e.g., the QSFP+ transceiver unit 102). At operation 430, the adapter device 106 receives transmission control signals from the CXP host port 104, and at operation 440, adjusts the transmission control signals to be compatible for reception by the QSFP+ transceiver unit 102. At operation 450, the adjusted transmission data signals and adjusted transmission control signals are sent to the QSFP+ transceiver unit 102.

It should be appreciated that the techniques described above in connection with all embodiments may be performed by one or more computer readable storage media that is encoded with software comprising computer executable instructions to perform the methods and steps described herein. For example, the operations performed by the adapter device 106 may be performed by one or more computer or machine readable storage media or device executed by a processor and comprising software, hardware or a combination of software and hardware to perform the techniques described herein.

In sum, an apparatus is provided comprising: a first connector unit configured to receive reception data signals at a data rate from a transceiver unit; a reception equalizer unit electrically connected to the first connector unit and configured to receive the reception data signals at the data rate across a first module signal path and to adjust the reception data signals to be compatible for reception by a host port; a microcontroller unit electrically connected to the first connector unit and configured to receive reception status signals from the first connector unit across a first module status signal path and to adjust the reception status signals to be compatible for reception by the host port; and a second connector unit electrically connected to the reception equalizer unit and the microcontroller unit and configured to: receive adjusted reception data signals from the reception equalizer unit across a second module signal path; receive adjusted reception status signals from the microcontroller unit across a second module status signal path; and send the adjusted reception data signals and the adjusted reception status signals to the host port.

In addition, an apparatus is provided comprising: a host connector unit configured to receive transmission data signals at a host data rate from a host port; a transmission equalizer unit electrically connected to the host connector unit and configured to receive the transmission data signals at the host data rate across a first host signal path and to adjust the transmission data signals to be compatible for reception by a transceiver unit; a microcontroller unit electrically connected to the host connector unit and configured to receive transmission control signals from the host port across a first host control signal path and to adjust the transmission control signals to be compatible for reception by the transceiver unit; and a module connector unit electrically connected to the transmission equalizer unit and the microcontroller unit and configured to: receive adjusted transmission data signals from the transmission equalizer unit across a second host signal path; receive adjusted transmission control signals from the microcontroller unit across a second host control signal path; and send the adjusted transmission data signals and the adjusted transmission control signals to the transceiver unit.

Furthermore, a method is provided comprising: at an adapter device, receiving reception data signals at a data rate from a transceiver unit; adjusting the reception data signals to be compatible for reception by a host port; receiving reception status signals from the transceiver unit; adjusting the reception status signals to be compatible for reception by the host port; and sending adjusted reception data signals and adjusted reception status signals to the host port.

Additionally, a method is provided comprising: receiving transmission data signals at a host data rate from a host port; adjusting the transmission data signals to be compatible for reception by a transceiver unit; receiving transmission control signals from the host port; adjusting the transmission control signals to be compatible for reception by the transceiver unit; sending adjusted transmission data signals and adjusted transmission control signals to the transceiver unit.

The above description is intended by way of example only. Various modifications and structural changes may be made therein without departing from the scope of the concepts described herein and within the scope and range of equivalents of the claims.

What is claimed is:

1. An apparatus comprising:
   a first connector unit configured to interface with a quad small form-factor pluggable (QSFP) transceiver unit and to receive reception data signals at a data rate from the QSFP transceiver unit;
   a reception equalizer unit electrically connected to the first connector unit and configured to receive the reception data signals at the data rate across a first module signal path and to adjust the reception data signals to be compatible for reception by a CXP host port;
   a microcontroller unit electrically connected to the first connector unit and configured to receive reception status signals from the first connector unit across a first module status signal path and to adjust the reception status signals to be compatible for reception by the CXP host port; and
   a second connector unit electrically connected to the reception equalizer unit and the microcontroller unit and configured to:

interface with the CXP host port;
receive adjusted reception data signals from the reception equalizer unit across a second module signal path;
receive adjusted reception status signals from the microcontroller unit across a second module status signal path; and
send the adjusted reception data signals and the adjusted reception status signals to the CXP host port.

2. The apparatus of claim 1, wherein the reception equalizer unit comprises a clock data recovery (CDR) unit configured to retime the reception data signals to improve the reception data signals for better signal integrity for reception by the CXP host port.

3. The apparatus of claim 1, further comprising a circuit adapter unit electrically connected to the reception equalizer unit across the second module signal path and configured to receive the adjusted reception data signals from the reception equalizer before the adjusted reception data signals are received by the second connector unit.

4. The apparatus of claim 3, wherein the circuit adapter unit is further configured to provide an electrical connection between the reception equalizer unit and a printed circuit board of the CXP host port.

5. The apparatus of claim 1, further comprising a power management unit electrically connected to the first connector unit and the second connector unit and configured to adjust power settings such that power supply pins on the first connector unit are configured to receive sufficient power.

6. The apparatus of claim 1, wherein the first connector unit is a 38-pin QSFP connector unit configured to interface with the QSFP transceiver unit and wherein the second connector unit is an 84-pin CXP connector unit configured to interface with the CXP host port.

7. The apparatus of claim 1, wherein the first connector unit is configured to receive the reception data signals at the data rate of 40 gigabits per second.

8. An apparatus comprising:
a host connector unit configured to interface with a CXP host port and to receive transmission data signals at a host data rate from the CXP host port;
a transmission equalizer unit electrically connected to the host connector unit and configured to receive the transmission data signals at the host data rate across a first host signal path and to adjust the transmission data signals to be compatible for reception by a quad small form-factor pluggable (QSFP) transceiver unit;
a microcontroller unit electrically connected to the host connector unit and configured to receive transmission control signals from the CXP host port across a first host control signal path and to adjust the transmission control signals to be compatible for reception by the QSFP transceiver unit; and
a module connector unit electrically connected to the transmission equalizer unit and the microcontroller unit and configured to:
interface with the QSFP transceiver unit;
receive adjusted transmission data signals from the transmission equalizer unit across a second host signal path;
receive adjusted transmission control signals from the microcontroller unit across a second host control signal path; and
send the adjusted transmission data signals and the adjusted transmission control signals to the QSFP transceiver unit.

9. The apparatus of claim 8, wherein the transmission equalizer unit comprises a clock data recover (CDR) unit configured to retime the transmission data for signals to improve the transmission data signals for better signal integrity for reception by the QSFP transceiver unit.

10. The apparatus of claim 8, further comprising a power management unit electrically connected to the host connector unit and the module connector unit and configured to adjust power settings such that power supply pins on the host connector unit are configured to receive sufficient power.

11. The apparatus of claim 8, wherein the host connector unit is an 84-pin CXP connector unit configured to interface with the CXP host port and wherein the module connector unit is a 38-pin QSFP connector unit configured to interface with the QSFP transceiver unit.

12. The apparatus of claim 8, wherein the host connector unit is configured to receive the transmission data signals at the host data rate of 40 gigabits per second.

13. A method comprising:
at an adapter device, receiving reception data signals at a data rate from a quad small form-factor pluggable (QSFP) transceiver unit;
adjust quality of the reception data signals to be compatible for reception by a CXP host port;
receiving reception status signals from the QSFP transceiver unit;
adjusting the reception status signals to be compatible for reception by the CXP host port; and
sending adjusted reception data signals and adjusted reception status signals to the CXP host port.

14. The method of claim 13, wherein adjusting the reception data signals comprises retiming the reception data signals to adjust the reception data signals to a format compatible for reception by the CXP host port.

15. The method of claim 13, wherein sending the adjusted reception data signals and the adjusted reception status signals comprises sending the adjusted reception data signals and the adjusted reception status signals to the CXP host port.

16. The method of claim 13, wherein receiving the reception data signals comprises receiving the reception data signals at the data rate of 40 gigabits per second.

17. A method comprising:
receiving transmission data signals at a host data rate from a CXP host port;
adjusting the transmission data signals to be compatible for reception by a quad small form-factor pluggable (QSFP) transceiver unit;
receiving transmission control signals from the CXP host port;
adjusting the transmission control signals to be compatible for reception by the QSFP transceiver unit; and
sending adjusted transmission data signals and adjusted transmission control signals to the QSFP transceiver unit.

18. The method of claim 17, wherein adjusting the transmission data signals comprises retiming the transmission data signals to adjust the transmission data signals to a format compatible for reception by the QSFP transceiver unit.

19. The method of claim 17, wherein sending the adjusted transmission data signals and the adjusted transmission control signals comprises sending the adjusted transmission data signals and the adjusted transmission control signals to the QSFP transceiver unit.

20. The method of claim 17, wherein receiving the transmission data signals comprises receiving the transmission data signals at the data rate of 40 gigabits per second.

* * * * *